May 20, 1952 G. A. GERBER ET AL 2,597,238
METHOD OF ADJUSTING THE SPEED OF VARIABLE-SPEED TURNTABLES
Filed Jan. 18, 1950
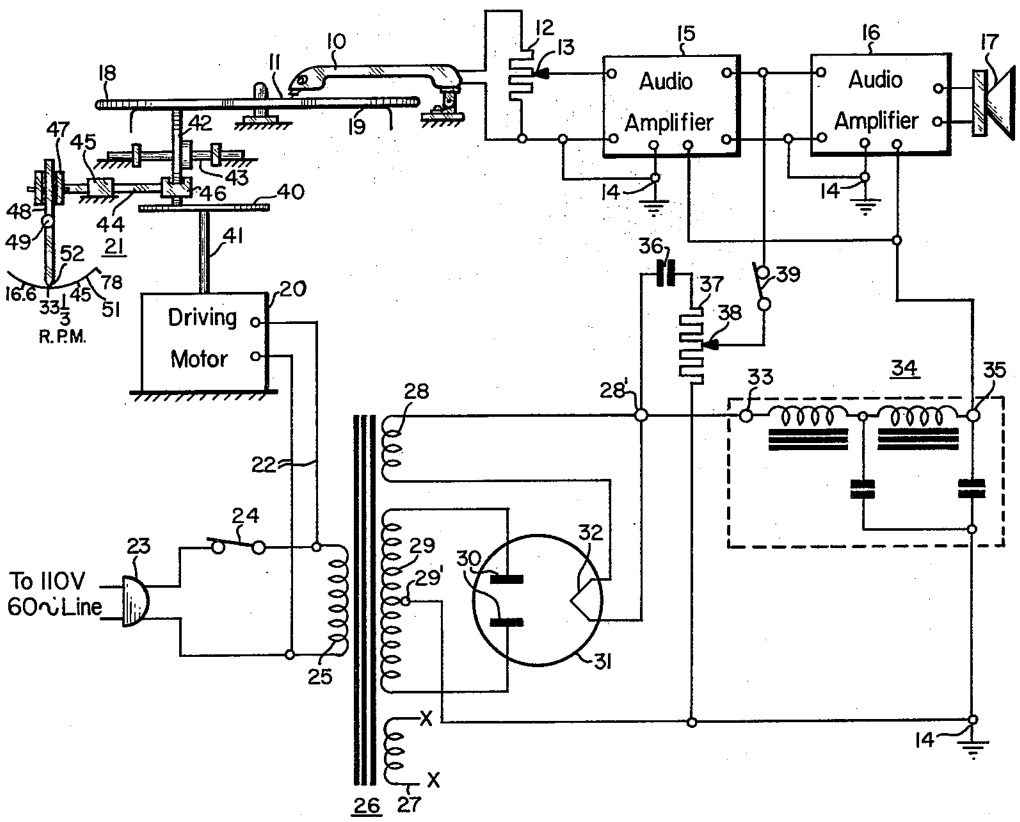
GEORGE A. GERBER
RALPH A. MULLANEY
*INVENTORS*
BY Francis W. Crotty
THEIR ATTORNEY Patented May 20, 1952 2,597,238

UNITED STATES PATENT OFFICE 2,597,238

METHOD OF ADJUSTING THE SPEED OF VARIABLE-SPEED TURNTABLES

George A. Gerber, Roselle, and Ralph A. Mullaney, Elmwood Park, Ill., assignors to Zenith Radio Corporation, a corporation of Illinois Application January 28, 1950, Serial No. 141,064

3 Claims. (Cl. 179—100.1)

This invention relates to a method of adjusting the speed of a variable speed turntable included in a phonograph apparatus.

With the advent of phonographs or record players having means for continuously varying the turntable speed, a need has arisen for a method which provides an accurate adjustment at preselected rotational speeds. It is recognized that one well-known method is to utilize the stroboscope principle in connection with a disc which has a predetermined pattern of dots. The disc is rotated by the turntable and the dots are observed under the light of a neon bulb energized from a 60 cycle alternating voltage source. The configuration of dots is such that when the turntable rotates at a predetermined speed the dots, as observed under the flashing light of the neon bulb, appear to stand still. While methods of this type have proved to be satisfactory, there are many instances in which the method cannot be practiced for want of necessary components such as the flashing light source.

Moreover, it has been proposed that record discs be prepared which have sundry information recorded thereon at a speed of 16.6 R. P. M. (revolutions per minute). In particular, it is contemplated that various literary works be recorded on these discs for use by persons who are blind. It is readily appreciated that the stroboscope type of speed adjustment for a variable speed turntable is entirely unsatisfactory for such persons.

It is an object of this invention therefore, to provide a novel method for adjusting the speed of a variable speed turntable.

It is another object of this invention to provide a method of adjusting the speed of a variable speed turntable aurally.

In accordance with the invention, the method of adjusting the speed of a variable speed turntable included in a phonograph apparatus to a preselected valve comprises, as one step, generating a signal having a frequency representing the rotational speed of the turntable and having a predetermined frequency in response to rotation of the turntable at its preselected value. A signal of a fixed reference frequency is derived and the generated and reference signals are compared to obtain a beat frequency representing their relative frequencies. The speed of the turntable is varied to establish this frequency at a zero value.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which the single figure of the drawing shows a diagram, partly schematic, of a phonograph apparatus which is arranged to practice the method of adjusting the speed of the turntable in accordance with the present invention.

The phonograph apparatus represented in the drawing includes a tone arm 10 having a conventional stylus and transducer 11 electrically coupled to a potentiometer 12, one terminal of which is connected to ground 14. A variable tap 13 on potentiometer 12 and a connection to ground 14 provides the input circuit connections to an audio amplifier 15. Amplifier 15 is coupled with an output audio amplifier 16, in turn, coupled to a loudspeaker 17.

The stylus 11 of tone arm 10 is engaged with the sound groove of a record disc 18, which will be described more fully hereinafter, rotatably supported by a turntable 19. Turntable 19 is rotated by a driving motor 20 through a driving system 21 which affords a continuously variable speed drive.

System 21 includes a driving disc 40 rotatably supported in a plane parallel to turntable 19 and coupled to driving motor 20 by a shaft 41. A driving connection is completed between the upper surface of disc 40 and the lower surface of turntable 19 by a driving gear 42 supported for rotational and longitudinal movement on a shaft 43 which is disposed in a plane parallel to turntable 19. A control shaft 44 is supported in a bearing 45 for sliding movement in a direction parallel to shaft 43 and a pair of U-shaped fork members 46 and 47 are disposed at opposite ends thereof. Fork member 46 is positioned so that its opposite legs straddle the parallel faces of driving gear 42. Thus, when shaft 44 is actuated in a longitudinal direction gear 42 is displaced correspondingly. A control arm 48 is supported for rotation about a pivot 49 and has one end thereof disposed between the legs of fork member 47 so that upon rotational movement of arm 48 shaft 44 is longitudinally displaced. The opposite extremity of arm 48 is provided with pointer 50 arranged to traverse a calibration scale 51. It is apparent that by adjusting the position of arm 48, idler gear 42 may be selectively positioned and a predetermined rotational speed may be established for turntable 19.

Motor 20 is usually of the synchronous constant-speed type and is electrically coupled by a pair of conductors 22 to a power plug 23 adapted to connect with a 110 volt, 60 cycle power line. A switch 24 is interposed in one of the conductors in order that the line circuit may be selectively completed to operate the phonograph.

Also connected to power plug 23 is the primary winding 25 of a power transformer 26. Transformer 26 includes one secondary winding 27 which is arranged to excite the filaments (not shown) of audio amplifiers 15 and 16, a second rectifier-filament secondary winding 28, and a high-voltage secondary winding 29 which has a center tap 29'. Each of the opposite terminals of high voltage winding 29 is connected to one of the two anodes 30 of a full-wave rectifier tube 31. Tube 31 also includes a filament 32 which is coupled to filament winding 28. The center-tap 29' of winding 29 is connected to ground 14 and one terminal 28' of rectifier-filament winding 28 is connected to the input terminal 33 of a $\pi$-type, condenser-choke filter 34. Filter 34 may be of any well-known variety which is effective to suppress the alternating component of the output voltage between an output terminal 35 and ground 14. Terminal 35 is coupled to the anode-supply circuits (not shown) of amplifiers 15 and 16.

Terminal 28' is connected through a coupling condenser 36 to one end of a potentiometer 37, the other end of which is connected to ground 14. A variable tap 38 on potentiometer 37 is connected through a switch 39 to the ungrounded common connection between the output circuit of amplifier 15 and the input circuit of amplifier 16.

The power supply, including transformer 26 and rectifier 31, may be recognized as a conventional full-wave system. On the primary winding 25 of transformer 26 there is impressed an alternating voltage of sinusoidal wave form which includes a complete cycle for each time-period $t$. The output voltage from the full-wave rectifier, that appears between terminal 28' and ground 14, is unidirectional and includes the usual two identical cycles for each period $t$. Hence, as is well known, the signal between terminal 28' and ground 14 is harmonically related to the frequency of the alternating voltage source, having a strong component equal to two times the power line frequency.

Record disc 18 includes four discrete sound grooves. Each groove has a signal frequency of 120 cycles per second (C. P. S.) recorded at one of the rotational speeds of 16.6, 33⅓, 45 or 78 R. P. M. Since the line frequency is 60 cycles per second, it is harmonically related to the recording frequency of 120 cycles per second.

In practicing the method of the invention, record disc 18 is rotatably supported on turntable 19 and the stylus 11 of tone arm 10 is tracked in the particular one of the sound grooves associated with the desired turntable speed. As an illustrative example, let it be assumed that a rotational speed of 16.6 R. P. M. is required and the tone arm stylus 11 is tracking in that sound groove of record 18 which carries undulations of a 120 C. P. S. signal recorded at 16.6 R. P. M. A signal having a frequency representing the rotational speed of the turntable is generated since the rate at which the undulations of the sound groove produce mechanical displacement of the tracking stylus 11 is directly dependent upon the turntable speed. This signal, translated through amplifiers 15 and 16, produces an audible tone in loudspeaker 17.

With switch 39 closed, the input circuit of amplifier 16 is coupled to the unfiltered output of the full-wave rectifier 31 and a fixed reference, 120 cycles per second, is derived. This signal is applied to the input circuit of amplifier 16 and thus the reference tone as well as the record-generated tone is reproduced by speaker 17.

The generated and the reference signals may now be compared aurally as to tone, and control 48 is manipulated to adjust the speed of turntable 19 and cause the record-produced tone approximately to match that of the reference signal. It will be noted that a beat frequency which represents the relative frequencies of the two tones is obtained and speed-control 48 is regulated to establish the beat frequency to a preselected value. In particular, when the value of the beat is adjusted to zero, the rotational speed of the turntable is equal to the preselected speed of 16.6 R. P. M., and hence, the required turntable speed for the selected example is established.

This procedure may be followed for any of the rotational speeds for which a sound groove is provided on record disc 18. Although four selected turntable speeds have been mentioned, it is entirely within the scope of the invention to provide any number of speeds.

In addition to the power-supply developed tone, it is within the contemplation of the invention to derive a signal of fixed reference frequency by any known means.

It is contemplated that record disc 18 may be provided with an additional sound groove having undulations of a frequency of 440 cycles per second recorded at 78 R. P. M. Thus, once the turntable speed is adjusted to 78 R. P. M. in accordance with the method of the present invention, musical instruments may be attuned to the 440 cycle reference. Also, it is contemplated that an audio signal developed from this 440 cycle sound groove be compared with a 440 cycle tone, for example from a piano, to adjust system 21 until, as indicated by a "zero beat" the proper speed of rotation is established for turntable 19.

It will be seen that the invention provides a method of adjusting the speed of a variable speed turntable which may be performed in connection with the sense of hearing and hence is entirely suitable for use by blind persons.

While a particular embodiment of the present invention has been shown and described, it will be obvious to those skilled in the art that changes and modifications may be made without departing from this invention in its broader aspects, and therefore, the aim in the appended claims is to cover all such changes and modifications as fall within the true spirit and scope of this invention.

We claim:

1. The method of adjusting the speed of a variable speed turntable included in a phonograph apparatus to a preselected value which comprises the steps of: generating a signal having a frequency representing the rotational speed of said turntable and having a predetermined frequency in response to rotation of said turntable at said preselected value; deriving a reference signal of said predetermined frequency; comparing said generated signal and said reference signal to obtain a beat frequency representing their relative frequencies; and varying the speed of said turntable to establish said beat frequency at a zero value.

2. The method of adjusting to a preselected value the speed of a variable speed turntable included in a phonograph apparatus having an amplifier supplied with power from a source of alternating voltage of a given frequency which comprises the steps of: generating a signal having a frequency representing the rotational speed of said turntable and having a frequency corresponding to a particular harmonic of said given frequency in response to rotation of said turntable at said preselected value; deriving a reference signal corresponding to said particular harmonic of said given frequency of said alternating voltage source; comparing said generated signal and said reference signal to obtain a beat frequency representing the difference in frequency of the compared signals; and varying the speed of said turntable to establish said beat frequency at a value of zero at which value the rotational speed of said turntable is equal to said preselected speed.

3. The method of adjusting to a preselected value the speed of a variable speed turntable included in a phonograph apparatus having an amplifier supplied with power by a full-wave rectifier from a source of alternating voltage of a given frequency which comprises the steps of: generating a signal having a frequency representing the rotational speed of said turntable and having a frequency equal to two times said given frequency in response to rotation of said turntable at said preselected value; deriving a reference signal from said full-wave rectifier having a frequency component equal to two times said given frequency of said alternating voltage source; comparing said generated signal and said component of said reference signal to obtain a beat frequency representing the difference in frequency of the compared signals; and varying the speed of said turntable to establish said beat frequency at a zero value.

GEORGE A. GERBER.
RALPH A. MULLANEY.

REFERENCES CITED

The following references are of record in the file of this patent:

UNITED STATES PATENTS

| Number | Name | Date |
|---|---|---|
| 1,707,260 | Fetter | Apr. 2, 1929 |
| 2,230,949 | Heller | Feb. 4, 1941 |
| 2,334,510 | Roberts | Nov. 16, 1943 |

FOREIGN PATENTS

| Number | Country | Date |
|---|---|---|
| 612,163 | Great Britain | Nov. 9, 1948 |